(12) United States Patent
Kudo et al.

(10) Patent No.: US 7,979,695 B2
(45) Date of Patent: Jul. 12, 2011

(54) PROGRAM GENERATING DEVICE AND MEDIUM FOR THE SAME

(75) Inventors: Yasuhiro Kudo, Aichi (JP); Masafumi Miyazawa, Aichi (JP)

(73) Assignee: Brother Kogyo Kabushiki Kaisha, Aichi (JP)

( * ) Notice: Subject to any disclaimer, the term of this patent is extended or adjusted under 35 U.S.C. 154(b) by 1131 days.

(21) Appl. No.: 11/727,913

(22) Filed: Mar. 29, 2007

(65) Prior Publication Data
US 2007/0234044 A1 Oct. 4, 2007

(30) Foreign Application Priority Data
Mar. 31, 2006 (JP) .................................. 2006-098060

(51) Int. Cl.
*H04L 29/06* (2006.01)
*G06F 12/14* (2006.01)
(52) U.S. Cl. ........................................ 713/156; 713/189
(58) Field of Classification Search .................. 713/156, 713/189
See application file for complete search history.

(56) References Cited

U.S. PATENT DOCUMENTS

| | | | | | |
|---|---|---|---|---|---|
| 5,825,877 | A | * | 10/1998 | Dan et al. | 705/54 |
| 5,841,870 | A | * | 11/1998 | Fieres et al. | 713/156 |
| 5,978,484 | A | * | 11/1999 | Apperson et al. | 705/54 |
| 2002/0112179 | A1 | * | 8/2002 | Riordan et al. | 713/200 |
| 2002/0197528 | A1 | * | 12/2002 | Zunke | 429/144 |
| 2003/0135668 | A1 | * | 7/2003 | Abe | 710/15 |
| 2003/0154376 | A1 | * | 8/2003 | Hwangbo | 713/173 |
| 2004/0139430 | A1 | * | 7/2004 | Eatough et al. | 717/174 |
| 2004/0167973 | A1 | * | 8/2004 | Shima et al. | 709/220 |
| 2004/0215754 | A1 | * | 10/2004 | Orleth et al. | 709/223 |
| 2004/0223179 | A1 | * | 11/2004 | Mentze et al. | 358/1.15 |
| 2005/0005097 | A1 | * | 1/2005 | Murakawa | 713/156 |
| 2005/0138387 | A1 | * | 6/2005 | Lam et al. | 713/185 |
| 2006/0136701 | A1 | * | 6/2006 | Dickinson | 712/205 |
| 2006/0200814 | A1 | * | 9/2006 | Kontinen et al. | 717/168 |
| 2006/0238789 | A1 | * | 10/2006 | Pesar | 358/1.13 |
| 2006/0253617 | A1 | * | 11/2006 | Lin et al. | 710/8 |
| 2007/0234043 | A1 | * | 10/2007 | Miyazawa | 713/156 |

FOREIGN PATENT DOCUMENTS

| | | |
|---|---|---|
| JP | 2005-175992 A | 6/2005 |
| JP | 2005-346630 A | 12/2005 |

* cited by examiner

*Primary Examiner* — Michael Pyzocha
(74) *Attorney, Agent, or Firm* — Scully, Scott, Murphy & Presser, P.C.

(57) ABSTRACT

A program generating device connected with at least one first device and at least one second device on a network comprises an authority information acquiring system that acquires authority information representing a process that the at least one second device is authorized to utilize among processes that can be executed by the at least one first device, an electronic certificate generating system that generates an electronic certificate that causes the at least one first device to certify the at least one second device, an application program selecting system that selects an application program for causing the at least one first device to execute the process that the at least one second device is authorized to utilize based on the authority information, and an installation program generating system that generates an installation program for installing the generated electronic certificate and the selected application program into the at least one second device.

8 Claims, 4 Drawing Sheets

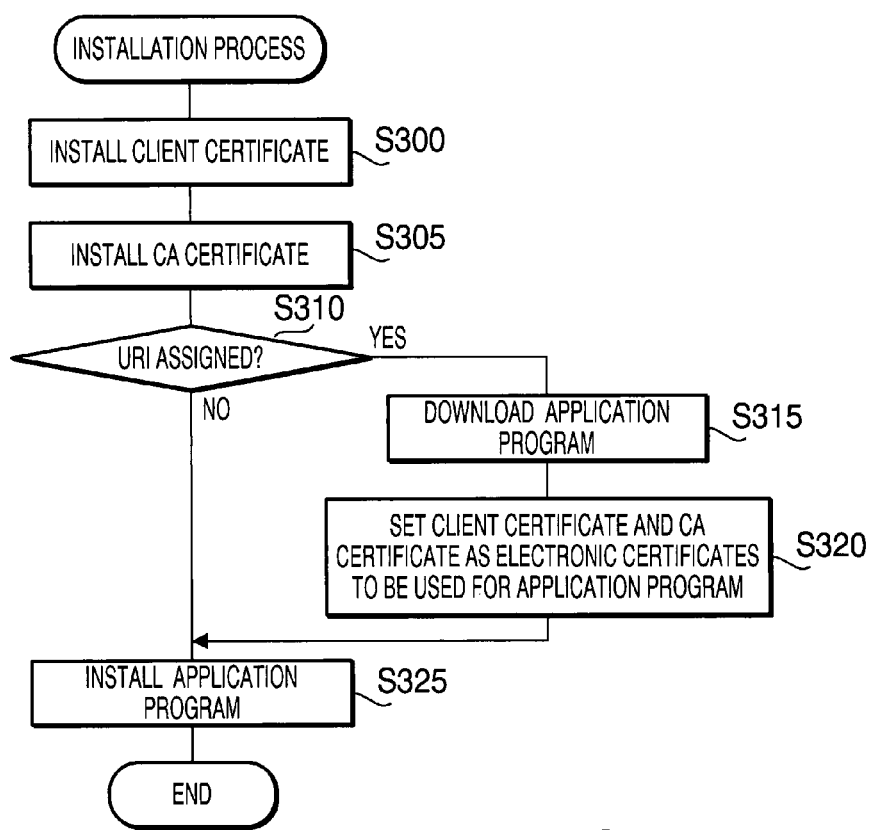

```
ACTUAL EXAMPLE OF INSTALLATION ASSIGNING SCRIPT FOR CLIENT CERTIFICATE
install_client_certificate( "alfread-smith. cert" ) ;
                              #1
ACTUAL EXAMPLE OF INSTALLATION ASSIGNING SCRIPT FOR CA CERTIFICATE
install_ca_certificate( "printer001. cert" ) ;
                         #2
ACTUAL EXAMPLE OF INSTALLATION ASSIGNING SCRIPT FOR PRINTER DRIVER
install_application( "printer001-smith. exe" ) ;
                      #3

ACTUAL EXAMPLE OF INSTALLATION ASSIGNING SCRIPT THAT DESIGNATES URI OF PRINTER DRIVER
download_uri( "http://example. com/download/driver. exe" , "driver. exe" ) ;
               #4
set_client_certificate( "driver. exe" , "alfread-smith. cert" ) ;
                                         #1
set_ca_certificate( "driver. exe" , "printer001. cert" ) ;
                                    #2
install_application( "driver. exe" ) ;
```

PROGRAM GENERATING DEVICE AND MEDIUM FOR THE SAME

CROSS-REFERENCE TO RELATED APPLICATION

This application claims priority under 35 U.S.C. §119 from Japanese Patent Application No. 2006-098060, filed on Mar. 31, 2006. The entire subject matter of the application is incorporated herein by reference.

BACKGROUND

1. Technical Field

The following description relates to one or more techniques for installing an electronic certificate and application program into an information processing device.

2. Related Art

An electronic certificate is utilized as one of means by which a server device certifies a terminal device at a user side via a network. Generally, the electronic certificate is acquired from various recording media or via the network by a user operation. Then, the electronic certificate is installed into the terminal device together with an application program for causing the server device to execute an intended process (for example, see paragraph [0075] in Japanese Patent Provisional Publication No. 2005-346630).

So far, as the server devices to be utilized by the terminal device increase, there is caused a problem that it is more difficult to judge which electronic certificate and which application program to be selected among the electronic certificates and application programs to be installed that are increased by the increase of the server devices.

Especially, even though the application programs to be installed are intended for the same server device, when each of the application programs is to be installed for a different process to be executed by the server device that the terminal device is authorized to utilize, it is further difficult to appropriately select the electronic certificate and application program to be installed.

SUMMARY

Aspects of the present invention are advantageous in that there can be provided one or more improved techniques that make it possible to easily install appropriate electronic certificate and application program into an information processing device even though the application program to be installed varies depending on a process that the information processing device is authorized to utilize.

BRIEF DESCRIPTION OF THE ACCOMPANYING DRAWINGS

FIG. 1 schematically shows a configuration of a communication system in accordance with one or more aspects of the present invention.

FIG. 4 is an illustration showing an example of an installation program generated in the program generating process in accordance with one or more aspects of the present invention.

FIG. 5 is a flowchart showing a procedure of an installation process in accordance with one or more aspects of the present invention.

DETAILED DESCRIPTION

Figure 1:
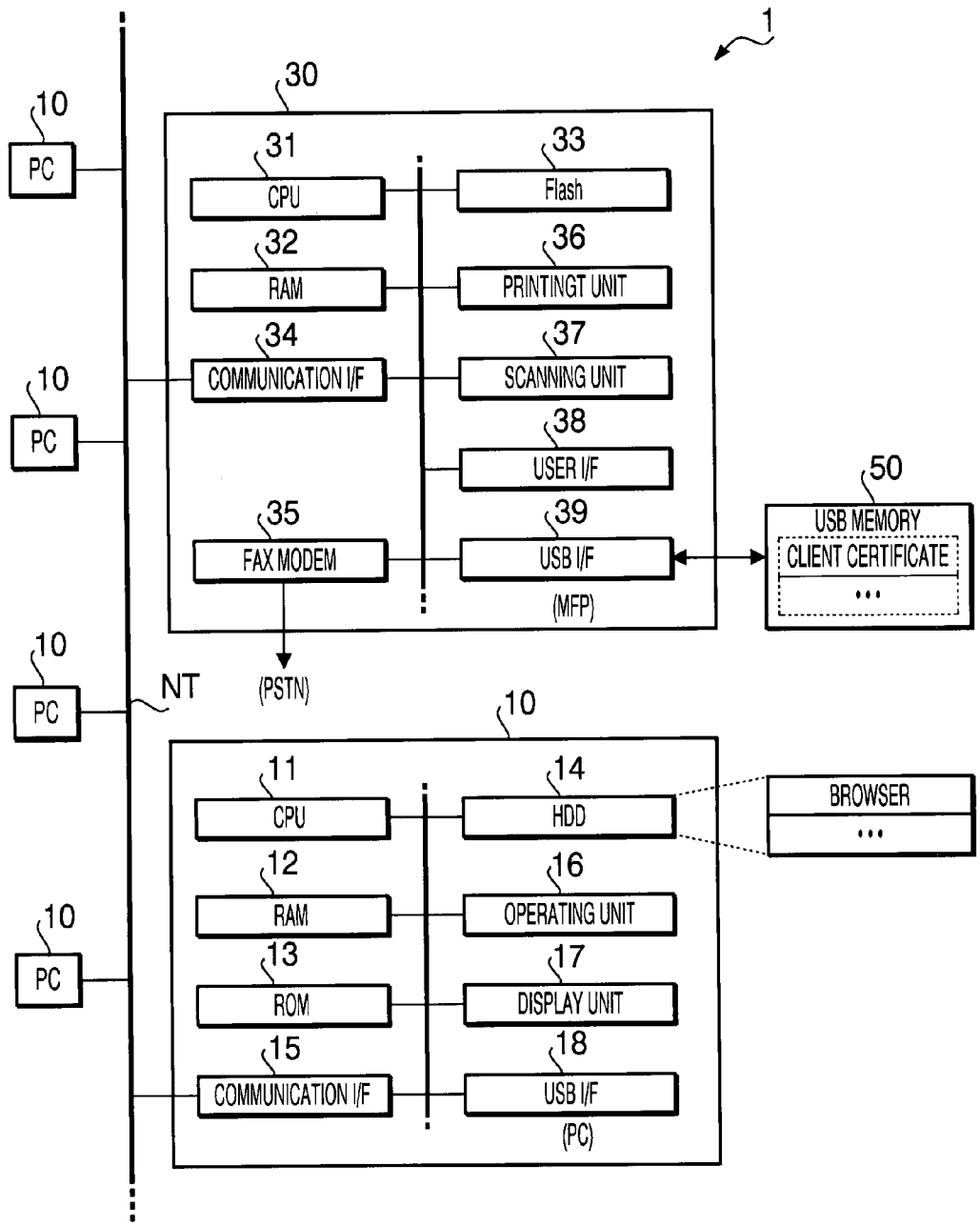

It is noted that various connections are set forth between elements in the following description. It is noted that these connections in general and, unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

General Overview

According to aspects of the present invention, there is provided a program generating device that can be used connected with at least one first device and at least one second device on a network, which comprises an authority information acquiring system configured to acquire authority information representing a process that the at least one second device is authorized to utilize among processes that can be executed by the at least one first device, an electronic certificate generating system configured to generate an electronic certificate that causes the at least one first device to certify the at least one second device, an application program selecting system configured to select an application program for causing the at least one first device to execute the process that the at least one second device is authorized to utilize based on the authority information, and an installation program generating system configured to generate an installation program for installing the electronic certificate generated by the electronic certificate generating system and the application program selected by the application program selecting system into the at least one second device.

According to some aspects, when the installation program generated by the program generating device is executed by the second device, the second device automatically installs the electronic certificate and application program thereinto.

Therefore, even though the application program to be installed varies depending on the process that the second device is authorized to utilize, it is possible to easily install an appropriate electronic certificate and application program into the second device.

It is noted that the program generating device may be provided separately from the first device and second device, or may be included in one of the first device and second device.

In addition, the installation program may be recorded on a recording medium and may be read out into the second device from the recording medium so as to be executed. Further, the installation program may be acquired by the second device via the network so as to be executed.

More specifically, the installation program generating system may be configured to generate the installation program that includes a first command that designates the electronic certificate as an object to be installed and instructs the at least one second device to install the electronic certificate thereinto and a second command that designates the application program as an object to be installed and instructs the at least one second device to install the application program thereinto.

In this case, the second device can install the electronic certificate and application program.

Alternatively or optionally, the installation program generating system may be configured to generate the installation program that includes a first command that designates the electronic certificate as an object to be installed and instructs the at least one second device to install the electronic certificate thereinto and a second command that designates an address representing an acquisition source of the application program selected by the application program selecting system and instructs the at least one second device to acquire the application program from the acquisition source represented by the address.

Still optionally, the installation program generated by the installation program generating system may further include a third command that designates the application program acquired from the acquisition source as an object to be installed and instructs the at least one second device to install the application program thereinto.

According to some aspects, the second device can install the electronic certificate and acquire the application program from the acquisition source designated by the installation program. Namely, the second device acquires the application program separately from the installation program. Therefore, it is possible to reduce a capacity required for the programs to be acquired by the second device. Thereby, when the installation program is provided via the network, it is possible to reduce a network traffic. Meanwhile, when the installation program is provided in a manner stored in the recording medium, it is possible to avoid compression of a memory area of the recording medium.

Optionally, the installation program generated by the installation program generating system may further include a fourth command that causes the at least one second device to designate the electronic certificate generated by the electronic certificate generating device as an electronic certificate to be used when the at least one second device executes the application program selected by the application program selecting system.

According to some aspects, a user is not required to select the electronic certificate to be used when the second device executes the application program. Therefore, it is possible to prevent the user from being troubled when the application program is executed, and to prevent an improper certificate different from the electronic certificate to be used from being selected.

According to another aspect of the present invention, there is provided a program generating device that is configured to execute a plurality of processes and connectable with at least one external device on a network, which comprises an authority information acquiring system configured to acquire authority information representing a process that the at least one external device is authorized to utilize among the plurality of processes that can be executed by the program generating device, an electronic certificate generating system configured to generate an electronic certificate that causes the program generating device to certify the at least one external device, an application program selecting system configured to select an application program for causing the program generating device to execute the process that the at least one external device is authorized to utilize based on the authority information, and an installation program generating system configured to generate an installation program for installing the electronic certificate generated by the electronic certificate generating system and the application program selected by the application program selecting system into the at least one external device.

According to the program generating device configured as above, when the installation program generated by the program generating device is executed by the external device, the external device automatically installs the electronic certificate and application program thereinto.

Therefore, even though the application program to be installed varies depending on the process that the external device is authorized to utilize, it is possible to easily install an appropriate electronic certificate and application program into the external device.

According to a further aspect of the present invention, there is provided a computer usable medium having computer readable instructions stored thereon, which, when executed by a processor included in a device connected with at least one first device and at least one second device on a network, cause the processor to perform steps of acquiring authority information representing a process that the at least one second device is authorized to utilize among processes that can be executed by the at least one first device, generating an electronic certificate that causes the at least one first device to certify the at least one second device, selecting an application program for causing the at least one first device to execute the process that the at least one second device is authorized to utilize based on the authority information, and generating an installation program for installing the electronic certificate generated in the step of generating the electronic certificate and the application program selected in the step of selecting the application program into the at least one second device.

According to the computer usable medium configured as above, the same effects as the aforementioned program generating device can be expected. It is noted that the computer usable medium includes a ROM and backup RAM incorporated into a computer, and a computer readable recording medium such as a flexible disk (FD), optical disk, hard disk drive, and a memory card.

Illustrative Aspects

Hereinafter, an embodiment according to aspects of the present invention will be described with reference to the accompanying drawings. FIG. 1 schematically shows a configuration of a communication system 1 that includes a digital multifunction peripheral (hereinafter, simply referred to as an "MFP") 30 provided with a function of a program generating device according to aspects of the present invention.

As shown in FIG. 1, the communication system 1 is provided with a plurality of personal computers (hereinafter, referred to as "PCs") 10 and the MFP 30 that are connected with a network NT.

Each of the PCs 10 includes a CPU 11 that executes various programs, a RAM 12 as a temporary memory area, a ROM 13 that stores a boot program and the like, a hard disk drive (HDD) 14, a communication interface (communication I/F) 15 connected with the network NT, an operating unit 16 that includes a keyboard and pointing device, display unit 17 that includes a liquid crystal monitor, and a USB (Universal Serial Bus) interface (USB I/F) 18 configured to be detachably connected with various USB device.

Further, there are installed into the HDD 14 of the PC 10, in addition to a widely-known multitask OS, application programs such as a browser that is software which can perform an operation of displaying a web page.

Meanwhile, the MFP 30 includes a CPU 31 that executes various programs, a RAM 32 as a temporary memory area, a flash memory 33 that stores the various programs and data, a communication interface (communication I/F) 34 connected with the network NT, a FAX modem 35 connected with a public switched telephone network (PSTN) to perform facsimile communication with an external facsimile machine, a printing unit 36 that forms a colored image or monochrome image on a printing paper with a laser printing method or an inkjet printing method, a scanning unit that optically scans an original placed on a stage and generates image data, a user interface (user I/F) 38 that includes various user-operable keys and a display unit, and a USB interface (USB I/F) 39 configured to be detachably connected with various USB devices.

Additionally, in the MFP 30, the CPU 31 executes the various programs to provide a printing function, scanning function, copy function, facsimile function, and web server function. For example, when receiving printing data from one of the external PCs 10 via the communication I/F 34, the CPU 31 executes a printing process for controlling the printing unit 36 to form a print image based on the printing data on a printing paper (printing function).

Further, when a scanning command is inputted through the user I/F 38 operated by a user, the CPU 31 executes a scanning process for controlling the scanning unit 37 to generate image data representing an image obtained by scanning an original placed on the stage and to send the generated image data to a predetermined PC 10 via the communication I/F 34 (scanning function).

In addition, when a copy command is inputted through the user I/F 38 operated by the user, the CPU 31 executes a copy process for controlling the scanning unit 37 to scan an original placed on the stage and controlling the printing unit 36 to print the scanned image on a printing paper (copy function).

Further, when a FAX transmission command is inputted through the user I/F 38 operated by the user, the CPU 31 executes a FAX transmission process for controlling the scanning unit 37 to scan an original placed on the stage and to generate facsimile data representing the scanned image, so as to send the generated facsimile data to a facsimile machine of a designated telephone number via the FAX modem 35 (facsimile function).

Further, the CPU 31 serves as the web server by executing a web server program stored in the flash memory 33. In response to an external access to a specific program managed by the function of the web server, the CPU 31 executes a management tool providing process, and sends a web page for displaying a management screen image to the PC 10 as an access source after user authentication. Thereby, a management tool for managing the MFP is provided to an administrator of the MFP 30 via the CPU 31 as the web server (management tool providing function).

Further, the CPU 31 certifies the PC 10 of the administrator with a client certificate or administrator password, and executes a program generating process described below when requested to add another user of the MFP 30 by the PC 10 of the administrator. Then, in the installation program generating process, the CPU 31 generates a client certificate and an installation program, and stores the generated client certificate and installation program into the USB memory 50 via the USB I/F 39.

Figure 2:
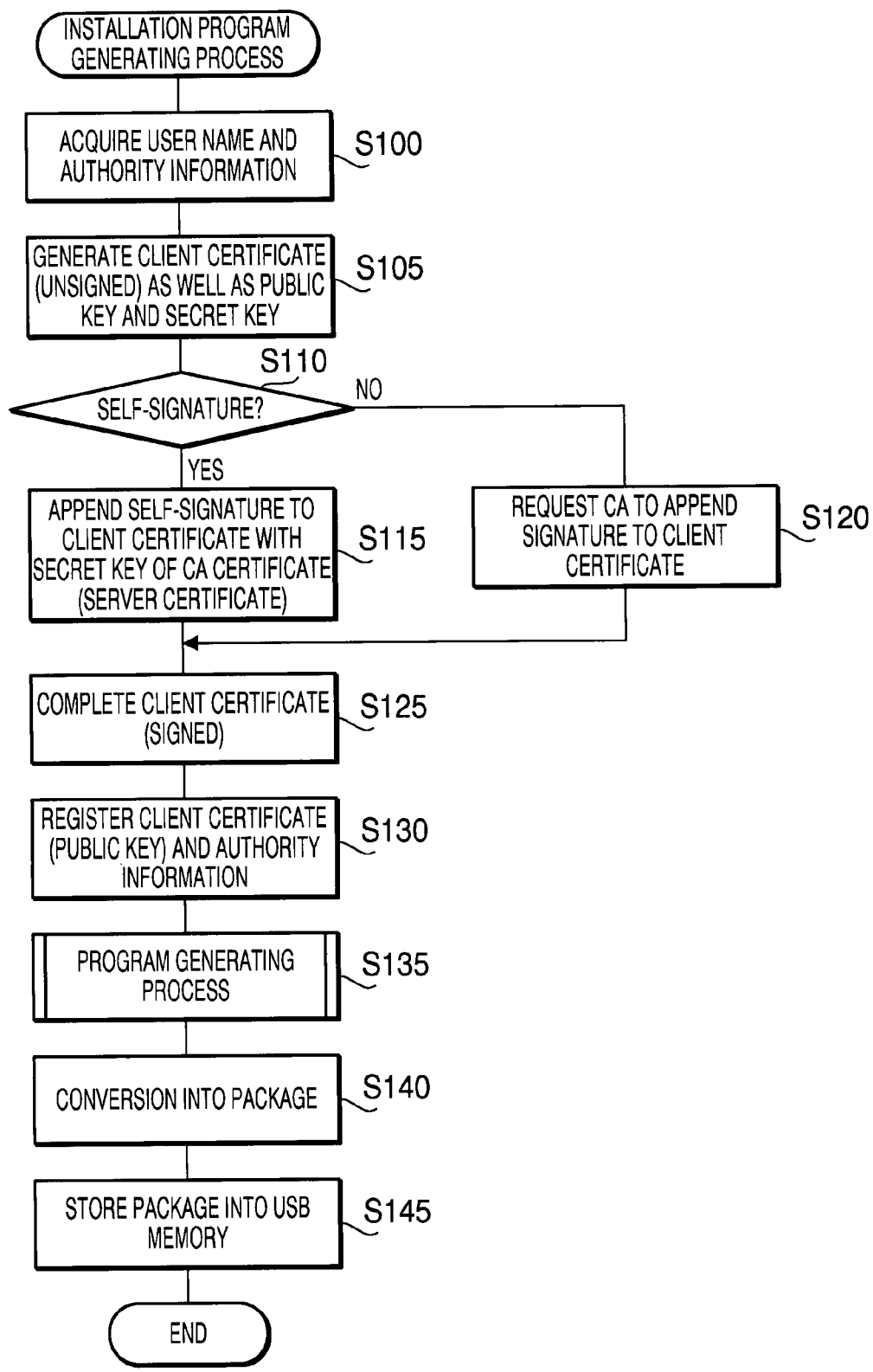
FIG. 2 is a flowchart showing a procedure of an installation program generating process in accordance with one or more aspects of the present invention.

FIG. 2 is a flowchart showing a procedure of the installation program generating process to be executed by the CPU 31. As shown in FIG. 2, in the process, firstly, a name of a user to be added and authority information representing a process that the user is authorized to utilize are acquired from the PC 10 of the administrator (S100). Subsequently, after generating an unsigned client certificate as well as a public key and a secret key (S105), it is judged whether the CPU 31 is requested to append electronic signature to the client certificate (namely, to append self-signature) by the PC 10 of the administrator (S110).

When it is judged that the CPU 31 is requested to append the self-signature (S110: Yes), the CPU 31 appends the self-signature to the client certificate with the secret key of a CA certificate (server certificate) as the electronic certificate of the MFP 30 (S115). Then, the process goes to a step S125 described below.

Meanwhile, when it is not judged that the CPU 31 is requested to append the self-signature (S110: No), the CPU 31 requests a predetermined certificate authority (CA) to append the electronic signature to the client certificate (S120). Thereafter, the CPU 31 completes the client certificate by appending the electronic signature to the client certificate (S125), and registers the client certificate including information on the public key and the authority information (S130). Then a program generating process described below is executed (S135).

When the program generating process has been completed, the client certificate that includes information on the public key and secret key, the CA certificate that includes information on the public key of the MFP 30, the installation program generated in the program generating process, and an application program selected in the program generating process are converted into a package (an execution file in the embodiment) (S140), and stored into the USB memory 50 (S145). Thereafter, the process is terminated.

Figure 3:
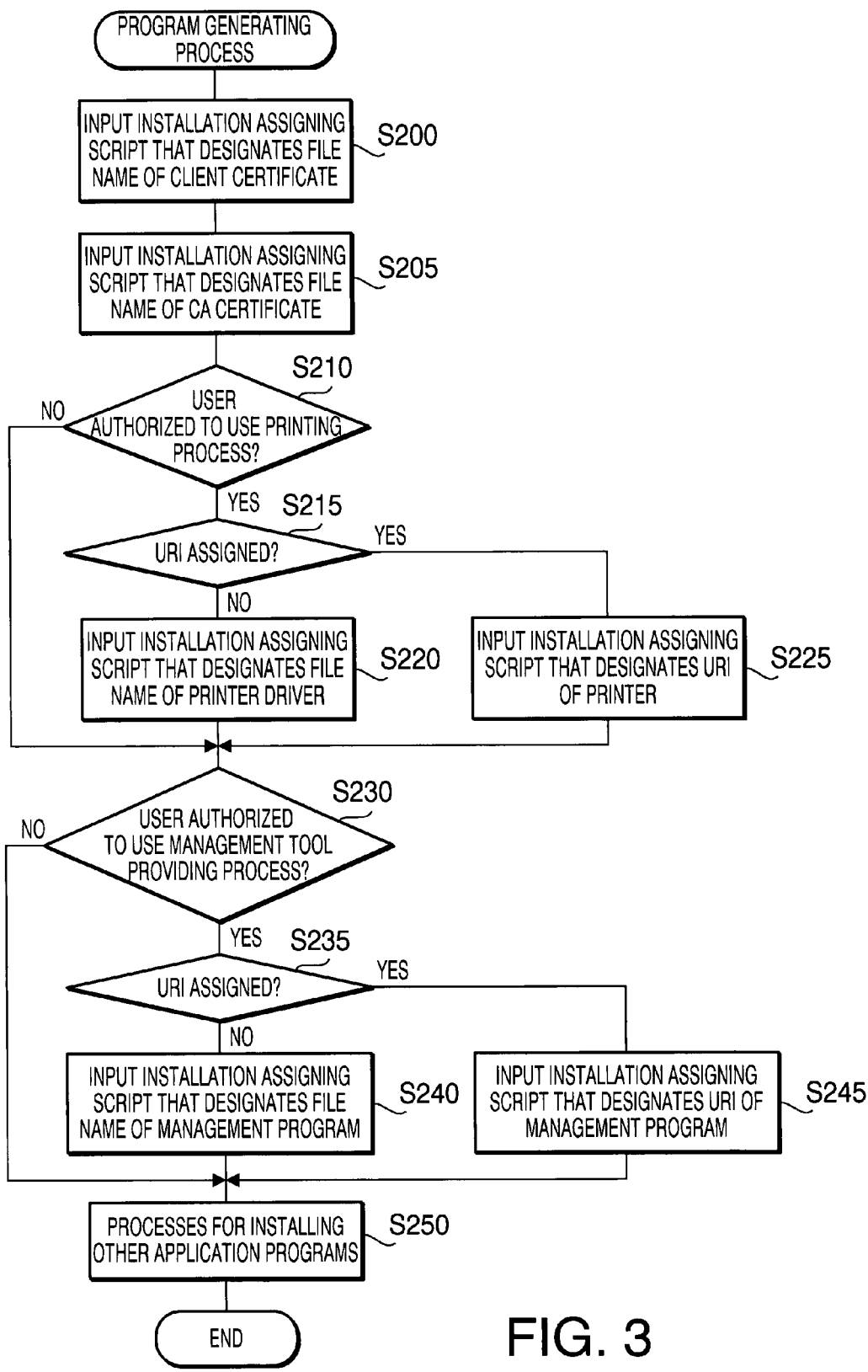
FIG. 3 is a flowchart showing a procedure of a program generating process in accordance with one or more aspects of the present invention.

FIG. 3 is a flowchart showing a procedure of the program generating process (S135). FIG. 4 is an illustration showing an example of the installation program generated in the program generating process.

As shown in FIG. 3, in the process, firstly, there is inputted into a file of the installation program an installation assigning script that designates a file name of the client certificate (#1 in FIG. 4) to specify an object to be installed and instructs to install the client certificate (S200). Subsequently, there is inputted into the file of the installation program an installation assigning script that designates a file name of the CA certificate (#2 in FIG. 4) to specify an object to be installed and instructs to install the CA certificate (S205).

Then, it is judged whether the user is authorized to utilize the printing process based on the aforementioned authority information registered in the RAM 32 in S130 (S210).

When it is not judged that the user is authorized (S210: No), the process goes to a step S230 described below. Meanwhile, when it is judged that the user is authorized (S210: Yes), it is judged whether a URI (Uniform Resource Identifier) is assigned to a printer driver that is an application program for the PC 10 causing the MFP 30 to execute the printing process (S215). It is noted that, in the embodiment, there is stored in the flash memory 33 any one of the printer driver and the URI of a source from which the printer driver is to be downloaded, and the CPU 31 makes the judgment based on the information stored in flash memory 33.

When it is not judged that the URI is assigned (S215: No), there is inputted into the file of the installation program an installation assigning script that designates a file name of the printer driver (#3 in FIG. 4) to specify an object to be installed and instructs to install the printer driver (S220).

In the meantime, when it is judged that the URI is assigned (S215: Yes), there is inputted into the file of the installation program an installation assigning script that designates the URI of the printer driver (#4 in FIG. 4) as a download source and instructs to install the printer driver (S225). It is noted that, in this case, the installation assigning script includes a script that instructs to download the printer driver, a script that specifies the aforementioned client certificate and CA certificate as the electronic certificate to be used when executing the printer driver, and a script that instructs to install the printer driver.

Then, based on the authority information registered in the RAM 32, it is judged whether the user is authorized to utilize the management tool providing process (S230).

When it is not judged that the user is authorized (S230: No), the process goes to a process of S250. Meanwhile, when it is judged that the user is authorized (S230: Yes), it is judged whether the URI is assigned to a management program that is an application program configured such that the PC 10 causes the MFP 30 to execute the management tool providing process (S235). It is noted that, in the embodiment, there is stored in the flash memory 33 any one of the management program and the URI of a source from which the management program is to be downloaded, and the CPU 31 makes the judgment based on the information stored in flash memory 33.

When it is not judged that the URI is assigned (S235: No), there is inputted into the file of the installation program an installation assigning script that designates a file name of the management program to specify an object to be installed and instructs to install the management program (S240).

In the meantime, when it is judged that the URI is assigned (S235: Yes), there is inputted into the file of the installation program an installation assigning script that designates the URI of the management program as a download source and instructs to install the management program (S245). It is noted that, in this case, the installation assigning script includes a script that instructs to download the management program, a script that designates the aforementioned client certificate and CA certificate as the electronic certificate to be used when executing the management program, and a script that instructs to install the management program.

Then, processes for installing other application programs are performed (S250), and the program generating process is terminated. It is noted that, in S250, with respect to other processes (such as the aforementioned scanning process and FAX transmission process) that can be executed by the MFP 30, the same processes as S210 to S225 and S230 to S245 are executed. That is, there is inputted into the file of the installation program an installation assigning script that selects one of the aforementioned other application programs corresponding to the authority information and instructs to install the selected application program.

The installation program generated as aforementioned is stored as the execution file into the USB memory 50 together with the client certificate and CA certificate, and is then handed the user of the PC 10 from the administrator of the MFP 30. Thereafter, the USB memory 50 is attached to the USB I/F 18 of the PC 10 by the user of the PC 10, and the execution file is run by a user operation. Thereby, in the PC 10, the CPU 11 runs the installation program and extracts each of the files so as to execute an installation process described below.

FIG. 5 is a flowchart showing a procedure of the installation process. As shown in FIG. 5, in this process, firstly, the client certificate stored in the USB memory 50 is installed into the PC 10 (S300), and then, the CA certificate stored in the USB memory 50 is installed into the PC 10 (S305).

In the installation program, when the URI is not assigned to the application program (S310: No), the process goes to the below-mentioned step of S325. Meanwhile, when the URI is assigned (S310: Yes), the application is downloaded from the assigned URI (S315).

When the download has been completed, the aforementioned client certificate and CA certificate are set as electronic certificates to be used for the downloaded application program (S320). Thereafter, the application program is installed into the PC 10 (S325), and the process is terminated. It is noted that, in S325, the downloaded application program or the application program stored in the USB memory 50 is installed into the PC 10.

The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without resorting to the details specifically set forth. In other instances, well known processing structures have not been described in detail, in order not to unnecessarily obscure the present invention.

Only exemplary embodiments of the present invention and but a few examples of its versatility are shown and described in the present disclosure. It is to be understood that the present invention is capable of use in various other combinations and environments and is capable of changes or modifications within the scope of the inventive concept as expressed herein.

For example, the electronic certificate and installation program, which are stored into the USB memory 50 in the step of S145 of the installation program generating process in the aforementioned embodiment, may be transmitted to the PC 10 via the network NT. It is noted that, in this case, a VPN (Virtual Private Network) such as an IPsec (IP Security Protocol) and SSL (Secure Sockets Layer) is preferred to be established between the MFP 30 and PC 10.

In addition, although the MFP 30 serves as the program generating device according to aspects of the present invention in the aforementioned embodiment, the PC 10 as the administrator of the MFP 30 may be configured to serve as the program generating device. Further, an information processing device provided separately from the MFP 30 and the PC 10 may be configured to serve as the program generating device according to aspects of the present invention.

What is claimed is:

1. A program generating device connectable with at least one first device and at least one second device on a network, comprising:
 a memory configured to store instructions; and
 a processor configured to execute the instructions stored on the memory to cause the program generating device to serve as:
 an authority information acquiring system configured to acquire authority information representing a process that the at least one second device is authorized to utilize among processes that can be executed by the at least one first device;
 an electronic certificate generating system configured to generate an electronic certificate that causes the at least one first device to certify the at least one second device;
 an application program selecting system configured to select an application program for causing the at least one first device to execute the process that the at least one second device is authorized to utilize based on the authority information; and
 an installation program generating system configured to generate an installation program for installing the electronic certificate generated by the electronic certificate generating system and the application program selected by the application program selecting system into the at least one second device, wherein the installation program is generated when a request to execute the process is received by the at least one first device.

2. The program generating device according to claim 1, wherein the program generating device is included in one of the at least one first device and the at least one second device.

3. The program generating device according to claim 1, wherein the installation program generating system is configured to generate the installation program that includes a first command and a second command,
wherein the first command designates the electronic certificate as an object to be installed, and instructs the at least one second device to install the electronic certificate thereinto, and
wherein the second command designates the application program as an object to be installed, and instructs the at least one second device to install the application program thereinto.

4. The program generating device according to claim 1, wherein the installation program generating system is configured to generate the installation program that includes a first command and a second command,
wherein the first command designates the electronic certificate as an object to be installed, and instructs the at least one second device to install the electronic certificate thereinto, and
wherein the second command designates an address representing an acquisition source of the application program selected by the application program selecting system, and instructs the at least one second device to acquire the application program from the acquisition source represented by the address.

5. The program generating device according to claim 4, wherein the installation program generated by the installation program generating system further includes a third command that designates the application program acquired from the acquisition source as an object to be installed and instructs the at least one second device to install the application program thereinto.

6. The program generating device according to claim 5, wherein the installation program generated by the installation program generating system further includes a fourth command that causes the at least one second device to designate the electronic certificate generated by the electronic certificate generating device as an electronic certificate to be used when the at least one second device executes the application program selected by the application program selecting system.

7. A program generating device that is configured to execute a plurality of processes and connectable with at least one external device on a network, comprising:
a memory configured to store instructions; and
a processor configured to execute the instructions stored on the memory to cause the program generating device to serve as:
an authority information acquiring system configured to acquire authority information representing a process that the at least one external device is authorized to utilize among the plurality of processes that can be executed by the program generating device;
an electronic certificate generating system configured to generate an electronic certificate that causes the program generating device to certify the at least one external device;
an application program selecting system configured to select an application program for causing the program generating device to execute the process that the at least one external device is authorized to utilize based on the authority information; and
an installation program generating system configured to generate an installation program for installing the electronic certificate generated by the electronic certificate generating system and the application program selected by the application program selecting system into the at least one external device, wherein the installation program is generated when a request to execute the process is received by the program generating device.

8. A computer-readable storage device having computer readable instructions stored thereon, which, when executed by a processor included in a device connectable with at least one first device and at least one second device on a network, cause the processor to perform steps of:
acquiring authority information representing a process that the at least one second device is authorized to utilize among processes that can be executed by the at least one first device;
generating an electronic certificate that causes the at least one first device to certify the at least one second device;
selecting an application program for causing the at least one first device to execute the process that the at least one second device is authorized to utilize based on the authority information; and
generating an installation program for installing the electronic certificate generated in the step of generating the electronic certificate and the application program selected in the step of selecting the application program into the at least one second device, wherein the installation program is generated when a request to execute the process is received by the at least one first device.

* * * * *